May 9, 1950     J. N. PAQUIN     2,506,737
RELIEF VALVE CAP
Filed March 25, 1948
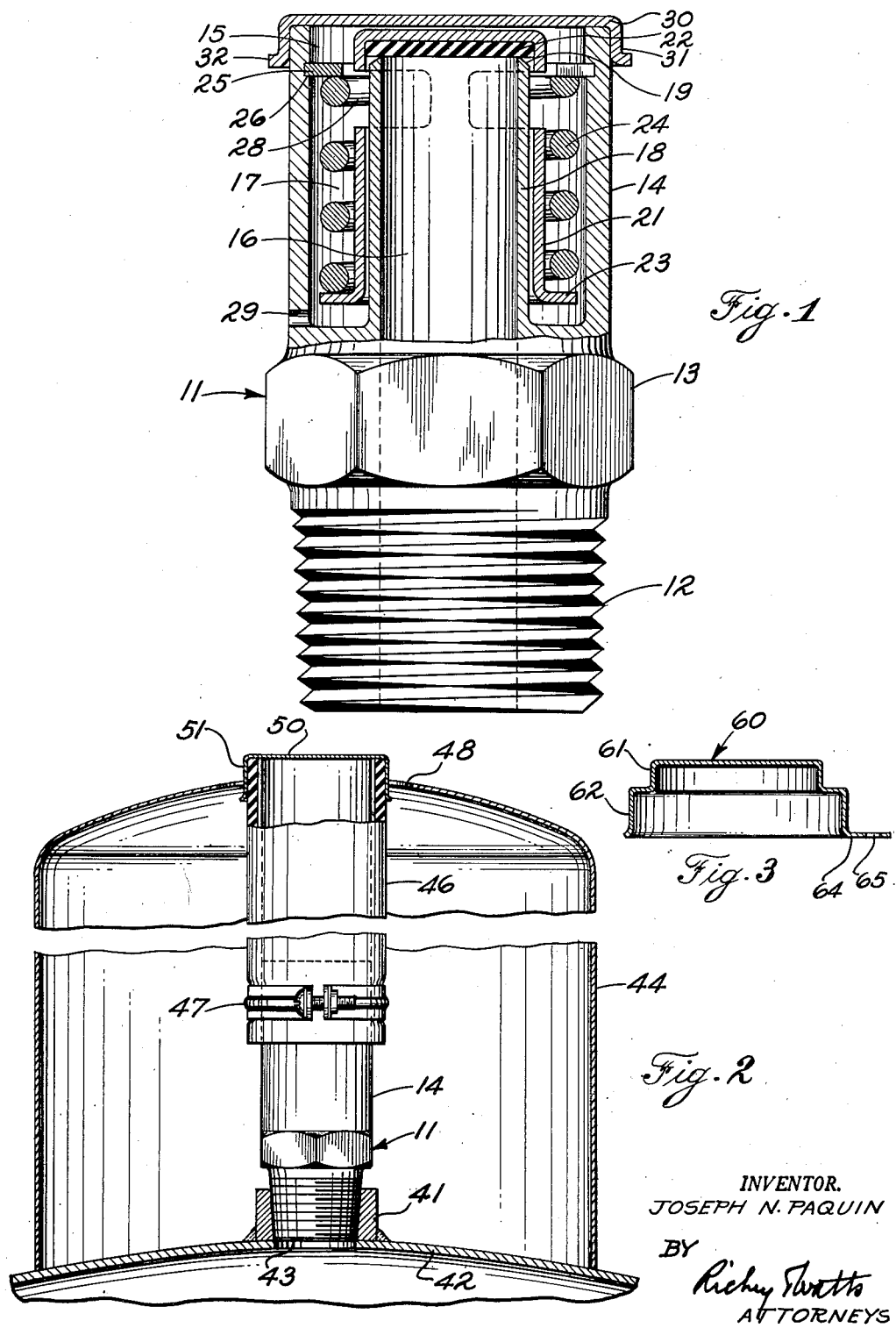
INVENTOR.
JOSEPH N. PAQUIN
BY
Richey Watts
ATTORNEYS Patented May 9, 1950

2,506,737

UNITED STATES PATENT OFFICE 2,506,737

RELIEF VALVE CAP

Joseph N. Paquin, Euclid, Ohio, assignor to The Weatherhead Company, Cleveland, Ohio, a corporation of Ohio Application March 25, 1948, Serial No. 17,090

2 Claims. (Cl. 137—53)

This invention relates to relief valves, and is particularly directed to the provision of a relief valve in which the mechanism is protected from the elements without sacrificing efficiency, compactness, and economy in the valve.

In many applications of relief valves, such, for example, as protective devices on storage tanks for liquefied petroleum gas, the valves are customarily installed in locations where they are exposed to the elements and may be adversely affected by precipitation, particularly when it occurs in conjunction with temperatures below the freezing point of water. The most suitable location for a relief valve on a liquefied gas tank is at the top of the tank, and the normal direction of the outlet of the relief valve is vertically upward. With this location of the outlet, it becomes possible for snow, and in some cases rain, to accumulate and freeze in the valve or for the valve to be clogged by accumulation of ice during a glaze storm.

It is obviously of the highest importance that a relief valve be absolutely reliable and free from failure due to icing conditions.

In some cases the valve can be protected from such clogging by providing a return bend on the outlet so that it discharges downward. Such a construction is disadvantageous, however, since it is cumbersome and expensive, and causes back pressure in the outlet from the relief valve, with the result that a larger relief valve is required for a given capacity. A permanent hood over the valve outlet is less effective, and suffers from the same disadvantages.

My invention contemplates the provision of a relief valve adapted for mounting on top of a tank with the inlet and outlet flow substantially vertical to secure greatest compactness and efficiency, and with protection of the valve mechanism against ice. In the preferred embodiment of the invention, this highly desirable result is obtained through the use of a cap which closes the valve outlet and is retained thereon frictionally or by gravity, and which will be displaced from the relief valve outlet, either by pressure in the valve or by a direct mechanical displacement by the movement of the valve member, upon operation of the relief valve.

This invention not only protects the relief valve, but has the subsidiary advantage that displacement of the cap serves as an indication that the valve has operated. As a further refinement of the invention, I contemplate the provision of a small subsidiary outlet or orifice so located as to be proof against the introduction of water or the formation of ice in the valve, the orifice being sufficient to pass small flows from the valve. In this way the cap is displaced when the flow is of such volume that high efficiency flow through the main outlet is desirable, but otherwise remains in place.

Objects of the invention are:

To increase the safety and reliability of relief valves;

To protect relief valves against faulty operation due to foreign matter;

To provide a relief valve which is protected against weather and is efficient, compact, and economical; and To indicate the operation of a relief valve.

Referring to the drawings:

Fig. 1 is an elevation view partially in longitudinal section of a relief valve embodying the invention;

Fig. 2 is an elevation view partly in section of a modified installation; and

Fig. 3 is a sectional view of a modified form of cap.

The relief valve illustrated in Fig. 1 incorporates many of the principles of construction of the relief valve described in the copending application of Andrew G. Johnson, Serial No. 785,939, filed November 14, 1947. As fully disclosed in that application, these principles result in a relief valve which is highly efficient, that is, discharges gas more rapidly than conventional relief valves of equivalent size. Moreover, the Johnson valve construction is compact, economical, and reliable.

The valve comprises a body 11 formed with a threaded portion 12 for mounting on a tank or other fitting, a preferably hexagonal nut portion 13, and a cylindrical portion 14 terminating in an outlet 15. The body is formed with an annular recess 16 and a through passage 17, with a cylindrical portion 18 between the void 16 and the passage 17 terminating below the outlet 15 in a valve seat 19. The movable valve member comprises a cup 21 slidable on the tube 18 and fitted with a seat disk 22 which normally engages the seat 19. The cup 21 is formed with a flange 23 against which a seating spring 24 bears. The seating spring may be retained by a snap ring 25 received in a groove 26 in the body of the fitting, or by other means, such as that disclosed in the abovementioned application. The movable valve member 21 is formed with a plurality of ports 28 immediately adjacent the valve disk 22 through which the fluid passes when the pressure rises to a point above that for which the compressive force of the spring is set, escaping fluid proceeding between the seat 19 and disk 22, through the ports 28, and to the atmosphere through the outlet 15. A small radial orifice 29 at the bottom of the recess 16 communicates with the atmosphere.

The structure so far described corresponds to that disclosed in the abovementioned application, the orifice 29 being provided in the Johnson valve to drain off rain water and prevent its accumulation within the recess 16 in which it might freeze and jam the valve, the valve being normally installed with the outlet 15 directed generally upward and the orifice 29 so located as to drain off any water within the recess 16. The orifice 29 also vents any water which may condense from the air within the valve body.

Under certain conditions, however, such as the occurrence of a sleet or glaze storm, or accumulation and congealing of snow in the valve, the movable valve member 21 and spring 24 could be jammed by accumulations of ice notwithstanding the provision of the orifice 29.

Although such failures would ordinarily be rare, absolute reliability of the relief valve is of utmost importance and it is therefore highly desirable to eliminate any possibility of valve failure from such causes.

This result is achieved in my invention by the provision of a cap 30 on the outlet end of the fitting. The cap 30 may, as shown, be formed with a flat circular central portion and a depending flange 31 which may be reinforced by a bead 32. The cap may be drawn from sheet metal in any conventional manner and should be of such dimensions as to slip freely or to press easily by hand onto the cylindrical portion 14 of the relief valve, which normally would be turned smoothly to an accurate dimension.

It will be noted that there is a small clearance between the valve member 21 and the cap 30 and thus the valve may lift slightly without engaging the cap. Thus, with a slight excess of pressure, vented fluid may pass through the orifice 29 and the protective cap 30 will remain in place. If the pressure within the tube 17 should rise rapidly, however, the valve member may lift farther and positively displace the cap 30. The friction of the cap, if any, is negligible in comparison to the pressure by the fluid on the valve member; therefore, it has no significant effect upon the opening of the valve.

Insofar as the present invention is concerned, however, the valve member need not engage the cap 30 and may be spaced sufficiently from the cap to open fully without rising to a position above the level of the outlet 15. In this case, as soon as the volume of fluid being discharged becomes sufficient that a slight pressure is built up within the valve due to throttling in the orifice 29, the cap 30 will be blown by fluid pressure from the valve. In the event the orifice 29 should be omitted or should become plugged in some manner, the cap 30 will be blown from position as soon as a small amount of gas is discharged from the valve. Thus, there is no diminution of the safety of the valve through the provision of the cap 30 since the pressure required to remove the cap is a negligible fraction of the pressure required to lift the valve member 21.

A modified embodiment of the invention is illustrated in Fig. 2, in which a relief valve 11, which may be identical to that illustrated in Fig. 1, is mounted in a boss 41 welded to the top end bell 42 of a pressure vessel in alignment with a port 43. The relief valve 11 is enclosed within a hood 44 which may also enclose other instrumentalities such as a pressure regulator, filling valves, and the like (not illustrated) as is well known to those skilled in the art. The hood 44 extends considerably above the relief valve 11, and in order to secure a direct atmospheric discharge for the relief valve, an extension is fitted thereto, which is preferably a length of flexible hose 46 clamped over the upper part of the cylindrical body 14 of the relief valve as by a conventional hose clamp 47. The upper end of the hose extends through an opening 48 in the top of the hood and is closed by a cap 50 formed with a depending flange 51 of inside diameter approximately equal to the outside diameter of the hose. As will be seen, the cap 50 is of the same general conformation as the cap 30 illustrated in Fig. 1. In the type of installation illustrated in Fig. 2, the cap 50 is, of course, not engaged by the movable valve member but is blown from its seat by pressure, in the event of any substantial discharge of gas.

It will be apparent that in either of the forms of the invention, the relief valve mechanism is fully protected against the entry of water, ice, or other foreign matter.

A further advantage of the invention is that the displacement of the cap provides an indication that excessive pressures have developed in the pressure vessel, a fact often unobserved; and thus may lead to the institution of measures to avoid future loss of gas. When the cap has been blown off, it may be readily replaced.

When the cap is dislodged, there is no interference whatever to the flow of gas from the fitting; the outlet is completely free and unobstructed, and there is no diminution of flow due to back pressure or turbulence resulting from a return bend or permanent shield over the valve Fig. 3 illustrates a modified form of cap which is suitable for use in either of the types of installations shown in Figs. 1 and 2. The cap 60 is formed with an inner flange 61 of the proper diameter to seat over the tubular portion 14 of the relief valve and an outer flange 62 dimensioned to fit a hose 46 of the appropriate size for the particular relief valve. The advantage of this construction is, of course, that only one cap need be supplied with a relief valve and the cap is suitable regardless of the ultimate installation. Fig. 3 also illustrates an additional feature which may be incorporated in any of the caps shown. An integral tab 64 extends from the cap and is perforated at 65 to receive a chain, wire, or the like (not shown) to prevent the cap from being blown completely away from the neighborhood of the relief valve when the valve operates.

Although the foregoing description is necassarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A relief valve comprising a body including a tubular outlet portion, a valve seat and a movable closure member therefor within the body, resilient means holding said closure member against said seat, and a cap yieldably retained on said tubular outlet portion closing said outlet, the said resilient means exerting a greater force than the force required to remove said cap from said outlet, said cap being of sufficient strength to resist rupture under the force required to remove said cap from said outlet, whereby the cap protects the interior of the outlet portion against entry of foreign material and is bodily displaced from said tubular outlet portion upon the occurrence of flow sufficiently great to develop pressure within the outlet portion relatively small compared to the pressure exerted by said resilient means.

2. A relief valve comprising a body including a tubular outlet portion, a valve seat and a movable closure member therefor within the body, resilient means holding said closure member against said seat, and a cap yieldably retained on said tubular outlet portion closing said outlet, the said resilient means exerting a greater force than the force required to remove said cap from said outlet, said cap being of sufficient strength to resist rupture under the force required to remove said cap from said outlet, said body being formed with a restricted opening to atmosphere, the total area of opening of said body to atmosphere with said cap in closing position on said tubular outlet portion being small relative to the area of said port opening, whereby the cap protects the interior of the outlet portion against entry of foreign material and is bodily displaced upon the occurrence of flow sufficiently great to develop pressure within the outlet portion relatively small compared to the pressure exerted by said resilient means.

JOSEPH N. PAQUIN.

REFERENCES CITED

The following references are of record in the file of this patent:

UNITED STATES PATENTS

| Number | Name | Date |
| --- | --- | --- |
| 213,292 | Lunkenheimer | Mar. 18, 1879 |
| 240,369 | Blake | Apr. 19, 1881 |
| 732,333 | Beiser | June 30, 1903 |
| 966,999 | Carssow | Aug. 9, 1910 |
| 1,951,926 | Davidson | Mar. 20, 1934 |
| 2,200,903 | Stephens | May 14, 1940 |
| 2,226,732 | McBride | Dec. 31, 1940 |
| 2,254,557 | Wittenberg | Sept. 2, 1941 |